(12) United States Patent
Darnel et al.

(10) Patent No.: US 10,741,897 B2
(45) Date of Patent: Aug. 11, 2020

(54) RF ROTARY JOINT USING A MATCHED HORN COUPLER ASSEMBLY

(71) Applicant: MacDonald, Dettwiler and Associates Corporation, Ste-Anne-de-Bellevue (CA)

(72) Inventors: Eric Darnel, Hudson (CA); Philippe Loiselle, Montréal (CA); Yan Brand, Ile-Bizard (CA)

(73) Assignee: MACDONALD, DETTWILER AND ASSOCIATES CORPORATION, Ste-Anne-de-Bellevue, Québec (CA)

( * ) Notice: Subject to any disclaimer, the term of this patent is extended or adjusted under 35 U.S.C. 154(b) by 163 days.

(21) Appl. No.: 16/116,554

(22) Filed: Aug. 29, 2018

(65) Prior Publication Data

US 2019/0067769 A1 Feb. 28, 2019

Related U.S. Application Data

(60) Provisional application No. 62/552,151, filed on Aug. 30, 2017.

(51) Int. Cl.
| | |
|---|---|
| *H01P 1/06* | (2006.01) |
| *H01P 1/165* | (2006.01) |
| *H01Q 19/10* | (2006.01) |
| *H01Q 3/20* | (2006.01) |
| *H01Q 1/12* | (2006.01) |
| *H04B 1/38* | (2015.01) |

(52) U.S. Cl.
CPC ............... *H01P 1/062* (2013.01); *H01P 1/06* (2013.01); *H01P 1/165* (2013.01); *H01Q 1/12* (2013.01); *H01Q 3/20* (2013.01); *H01Q 19/10* (2013.01); *H04B 1/38* (2013.01)

(58) Field of Classification Search
CPC . H01P 1/062; H01P 1/165; H01P 1/06; H01Q 3/20; H01Q 1/12; H01Q 19/10
USPC ........................................................... 343/786
See application file for complete search history.

(56) References Cited

U.S. PATENT DOCUMENTS

| | | | |
|---|---|---|---|
| 4,511,868 A * | 4/1985 | Munson .................. | H01P 1/067 333/21 A |
| 6,396,448 B1 * | 5/2002 | Zimmerman ............ | H01Q 3/14 343/753 |
| 6,556,174 B1 * | 4/2003 | Hamman .................. | H01Q 3/20 343/754 |
| 6,859,183 B2 * | 2/2005 | Carter .................... | H01Q 19/00 343/754 |

* cited by examiner

*Primary Examiner* — Hai V Tran
(74) *Attorney, Agent, or Firm* — Praxis

(57) ABSTRACT

A matched horn coupler assembly is used in a RF rotational joint for conveying an electromagnetic signal. The coupler assembly includes first and second feed horns defining respective first and second horn longitudinal axes intersecting one another at an intersection point. The first and second feed horns connect to a mirror for conveying the signal there between with the intersection point lying on a reflecting surface of the mirror which defines a normal direction thereof at the intersection point. The normal direction is equally angularly spaced from both the first and second horn longitudinal axes. First and second lenses connect to the respective first and second feed horns and focus the signal there between and at the intersection point. At least one of the first and second feed horns is rotatably connected relative to the mirror about the respective horn longitudinal axis.

8 Claims, 7 Drawing Sheets

1

RF ROTARY JOINT USING A MATCHED HORN COUPLER ASSEMBLY

CROSS REFERENCE TO RELATED APPLICATIONS

This application claims priority of U.S. Provisional Application for Patent No. 62/552,151 filed Aug. 30, 2017, the content of which is incorporated herein by reference in its entirety.

FIELD OF THE INVENTION

The present invention relates to the field of antenna assemblies, and is more particularly concerned with a RF (Radio Frequency) rotational joint using a matched horn coupler assembly typically used in steerable antenna structures, and capable of simultaneously convey Tx (Transmit) and Rx (Receive) RF signals on two orthogonal polarizations there through.

BACKGROUND OF THE INVENTION

It is well known in the art of RF antennas, as commonly used onboard spacecraft, or in ground stations, for communication to transmit and/or receive electromagnetic RF signals, to use rotational joints to allow the RF signals to follow the rotation of a portion of the antenna feed chain. When some sections (or portions) or an antenna assembly needs to rotate relative to a fixed structure, the RF signals travelling or conveyed within the antenna feed system usually goes through rotating joints which induce RF signal losses as well as other drawbacks including electrical constraints (such as reduced signal frequency bands, Passive Inter-Modulation (PIM) products, limitations on RF power handling, etc.), and mechanical constraints (such as increase complexity, mass (which is especially of concern in space applications), etc.). This becomes even more troublesome when multiple axes of rotations are considered.

The above constraints get more important when a plurality of signals run through the rotating assembly, such as transmit (Tx) and receive (Rx) signals, and using both orthogonal polarizations of each one.

U.S. Pat. No. 4,511,868 of Munson et al. discloses a mechanically rotatable joint in which the wide ends of two similar horn structures are juxtaposed and joined by a rotary bearing extending there between which permits relative rotational motion between the two horn structures. A field shaping dielectric lens may be disposed at the relatively rotatable horn juncture to help ensure substantially planar wavefront shapes across the relatively rotatable joint. This rotatable joint does not allow rotations about different intersecting axes.

Accordingly, there is a need for an improved RF rotational joint using a matched horn coupler assembly.

SUMMARY OF THE INVENTION

It is therefore a general object of the present invention to provide an improved RF rotational joint using a matched horn coupler assembly that could obviate the above-mentioned problems.

An advantage of the present invention is that the RF rotational joint using a matched horn coupler assembly essentially replaces at least one, but typically two rotating joints which are relatively complex, electrically lossy and often limited to narrow band signals, and this, for each signal transmitted there through. Since there could be both Tx and Rx signals, each with two possible orthogonal polarizations and multiple sub-frequency (wavelength) bands, four (4) times two rotating joints could be thus replaced by a single matched horn coupler assembly.

Another advantage of the present invention is the RF rotational joint using a matched horn coupler assembly allows relatively wideband signals, relatively low electrical signal losses, with no PIM (Passive Inter-Modulation) products.

Another advantage of the present invention is that the RF rotational joint using a matched horn coupler assembly allows the signals transmitted there through to be essentially non-sensitive to the rotation(s) of any part about any one, or both (simultaneously or not) coupler horn axes (input and output coupler horn axes), the rotation being performed with any suitable mechanism.

A further advantage of the present invention is that the RF rotational joint using a matched horn coupler assembly, depending on the actual configuration, may have up to three (3) ball bearing crowns to allow rotations of different parts thereof relative to one another and about any one of the two feed horn axes.

Still another advantage of the present invention is that the RF rotational joint using a matched horn coupler assembly can be easily scaled to frequency bands up to millimeter-wave bands.

Yet another advantage of the present invention is that the RF rotational joint using a matched horn coupler assembly has no mechanical wear in any parts of the RF signal path, thus ensuring constant RF performance over a virtually infinite lifetime as the RF signal path does not have any wearing parts.

Yet a further advantage of the present invention is that the RF rotational joint using a matched horn coupler assembly is free of contact sources that may create signal passive intermodulation (PIM) such as rotating metallic contacts.

Yet a further advantage of the present invention is that the RF rotary joint using a matched horn coupler assembly, when connected to the appropriate antenna feed systems, allows to convey multiple independent RF signals, using multiple frequencies and polarizations in a single matched horn coupler assembly.

According to an aspect of the present invention there is provided a matched horn coupler assembly for use in a RF rotational joint for conveying an electromagnetic signal, the matched horn coupler assembly comprising:

first and second feed horns defining respective first and second horn longitudinal axes intersecting one another at an intersection point, the first and second feed horns connecting to a mirror for conveying the signal therebetween with the intersection point lying on a reflecting surface of the mirror, the reflecting surface defining a normal direction thereof at the intersection point, the normal direction being generally equally angularly spaced from both the first and second horn longitudinal axes; and first and second lenses connecting to respective said first and second feed horns and focusing the signal between the respective said first and second feed horns and at the intersection point;

wherein at least one of the first and second feed horns is rotatably connected relative to the mirror about the respective one of said first and second horn longitudinal axes.

In one embodiment, the first feed horn is fixedly connected relative to the mirror and the second feed horn is rotatably connected relative to the mirror about the second horn longitudinal axis, the first and second feed horns and the mirror being rotatable relative to the first horn longitudinal axis.

In one embodiment, the second feed horn is rotatably connected relative to the mirror about the second horn longitudinal axis, and wherein the second feed horn and the mirror are jointly rotatably connected to the first feed horn about the first horn longitudinal axis.

Conveniently, the second feed horn is rotatably connected relative to the mirror about the second horn longitudinal axis, and wherein the second feed horn and the mirror are jointly rotatably connected to a supporting structure about the first horn longitudinal axis, and, typically, the first feed horn is fixedly connected to the supporting structure.

Alternatively, the first feed horn is rotatably connected to the supporting structure about the first horn longitudinal axis.

Conveniently, the first feed horn and both the second feed horn and the mirror are independently rotatably connected to the supporting structure relative to one another.

In one embodiment, the first and second feed horns and the mirror simultaneously convey a plurality of electromagnetic signals from the first feed horn to the second feed horn and/or from the second feed horn to the first feed horn.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

Figure 1:
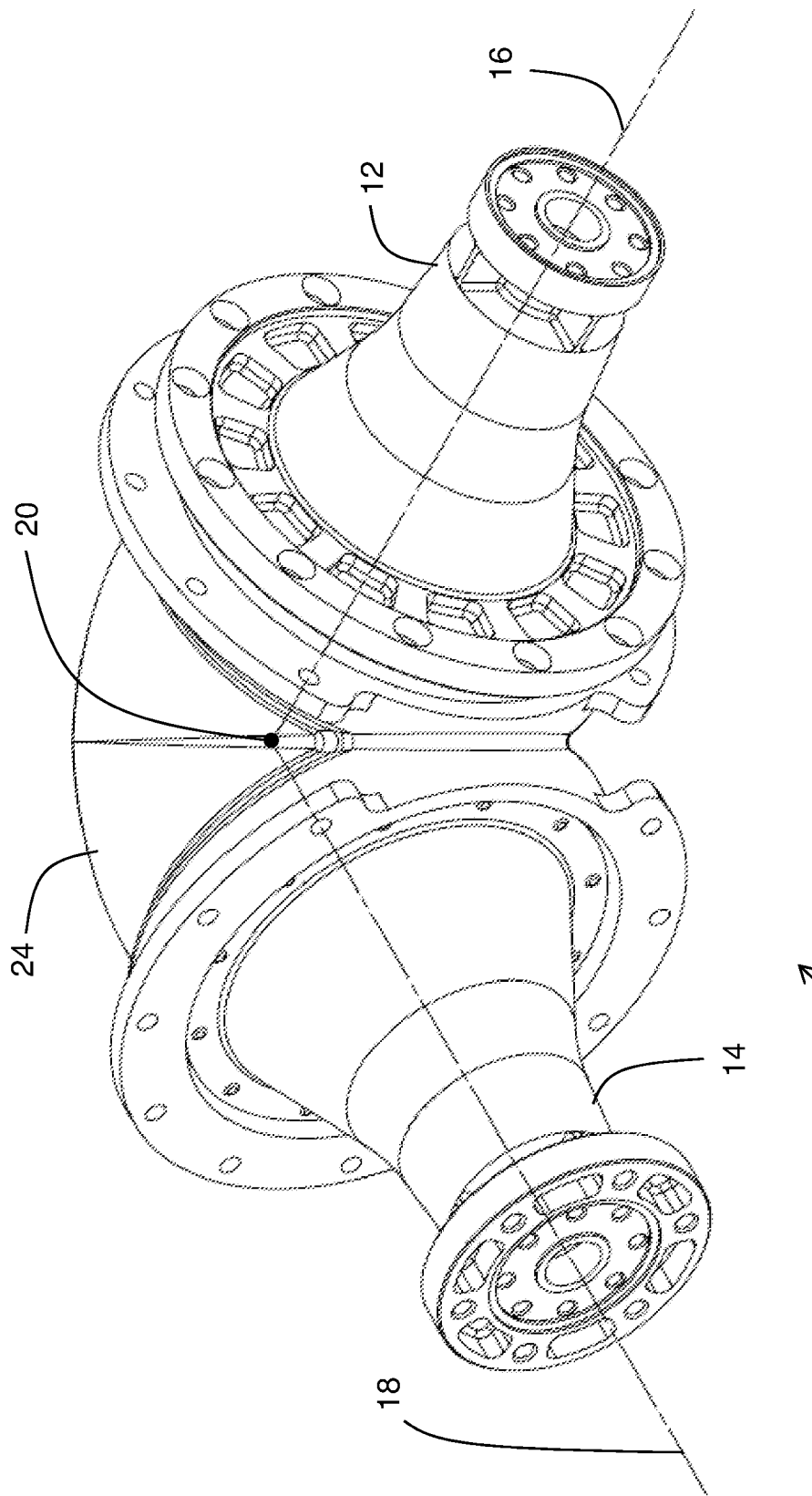
FIG. 1 is a front perspective view of a matched horn coupler assembly in accordance with an embodiment of the present invention.

With reference to the annexed drawings the preferred embodiment of the present invention will be herein described for indicative purpose and by no means as of limitation.

In the drawings, there is shown a RF rotational joint using a matched horn coupler assembly for transmitting at least one electromagnetic (RF) signal in accordance with an embodiment 10 of the present invention, usually for use within an antenna assembly (not shown), typically onboard of a spacecraft or the like.

Figure 2:
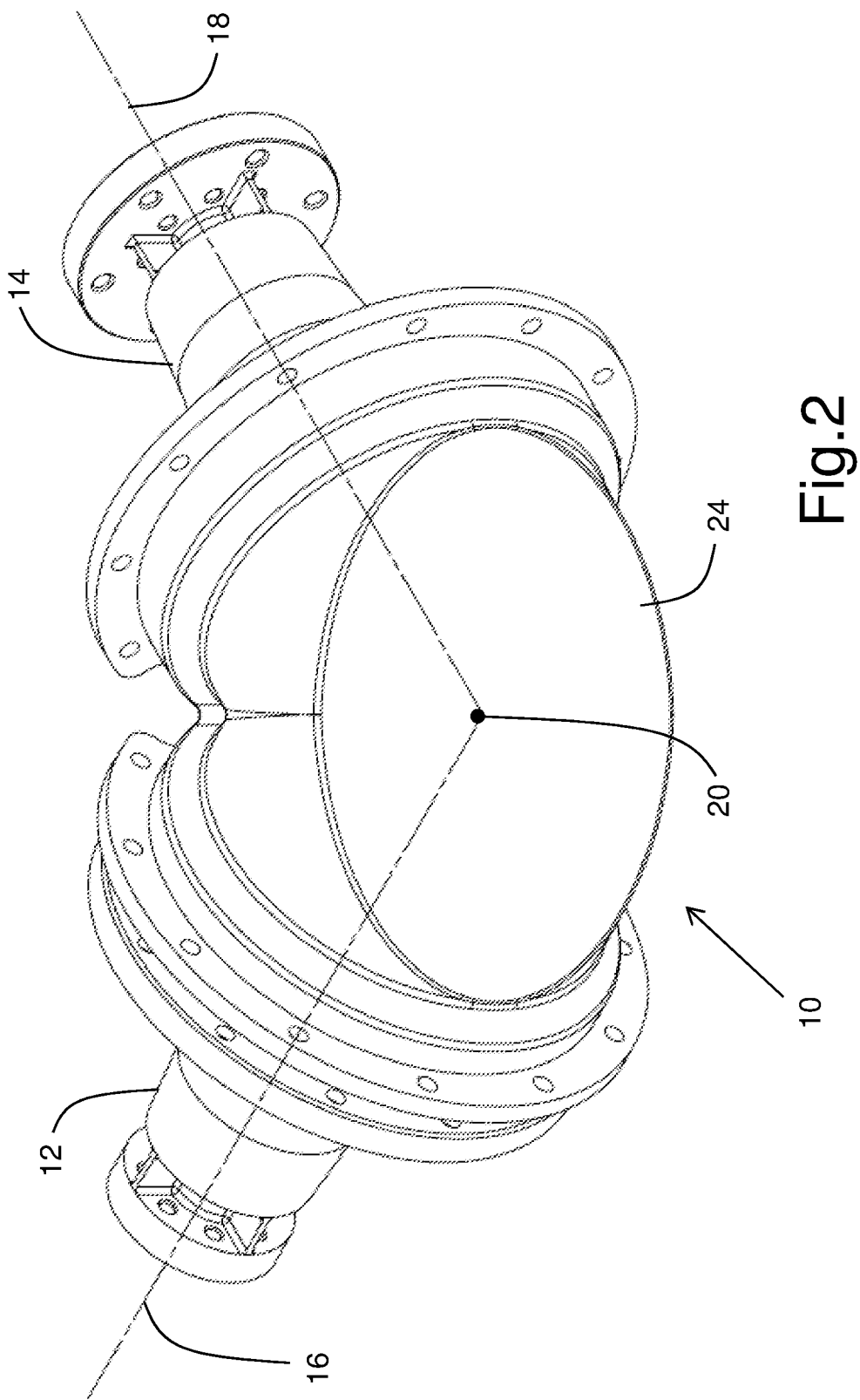
FIG. 2 is a rear perspective view of the embodiment of FIG. 1.
Figure 3:
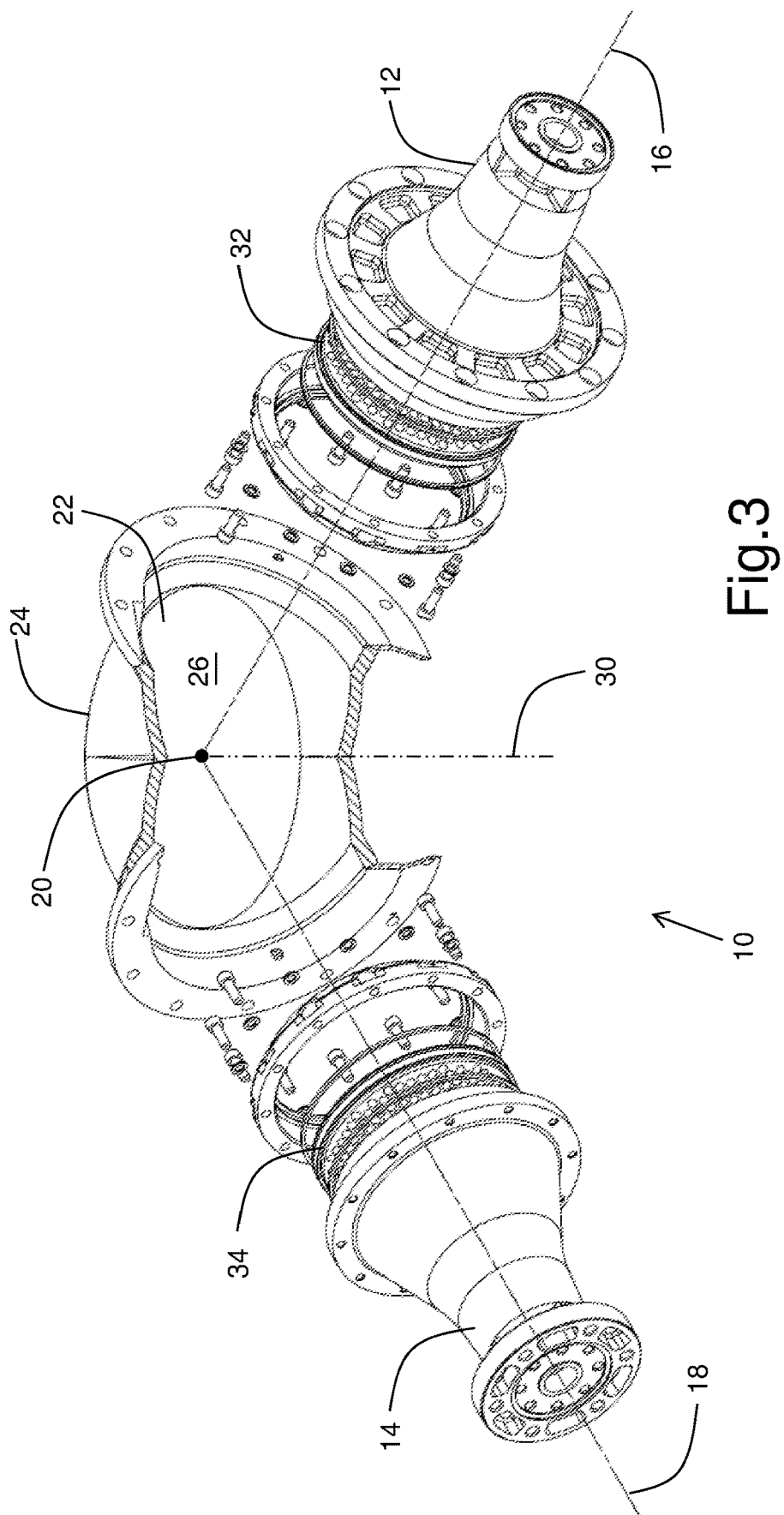
FIG. 3 is an exploded, partially sectioned front perspective view of the embodiment of FIG. 1.

Referring more specifically to FIGS. 1-3, the assembly 10 typically includes first 12 and second 14 feed horns defining respective first 16 and second 18 horn longitudinal axes intersecting one another at an intersection point 20. The first 12 and second 14 feed horns connect to a generally flat electromagnetic signal mirror 22 typically located within a mirror housing 24 for conveying or conducting (reflecting when referring to the mirror 22) the signal therebetween with the intersection point 20 lying on a reflecting surface 26 of the mirror 22 (and thus being also a reflection point). The reflecting surface 26 defines a normal direction 30 thereof at the intersection point 20, and the normal direction 30 is generally equally angularly spaced from both the first 16 and second 18 horn longitudinal axes. First 32 and second 34 lenses, typically made out of a dielectric material or the like, operatively connect to the respective first 12 and second 14 feed horns, and also preferably physically mounted thereon (although they could also be mounted on the mirror housing without departing from the scope of the present invention), and both focus the signal between the respective feed horn 12, 14 and at the intersection point 20.

Typically, at least one of the first 12 and second 14 feed horns is rotatably connected relative to the mirror 22 (and housing 24) about the respective one of the first 16 and second 18 horn longitudinal axes.

Preferably, as in the configuration shown, the first feed horn 12 is fixedly connected relative to the housing 24 and its mirror 22, and the second feed horn 14 is rotatably connected relative to the mirror 22 (and the first feed horn 12) about the second horn longitudinal axis 18. The first 12 and second 14 feed horns and the mirror 22 are rotatable relative to a supporting structure 40 (as a bracket or the like—see FIGS. 4-6) about the first horn longitudinal axis 16.

In the illustrated embodiment, the first 12 and second 14 feed horns could be labelled as input and output feed horns when referring to a Tx signal(s) of the antenna system (not shown), and reversely when referring to the Rx signal(s). Also, each one of the Tx and Rx signals could refer to a plurality of signals, being either different independent signals having different frequency sub-bands, or different polarizations (circular, elliptical, linear) of a same signal at a same frequency band. All the above signals could be independently and simultaneously conveyed by the matched horn coupler assembly 10.

Figure 4:
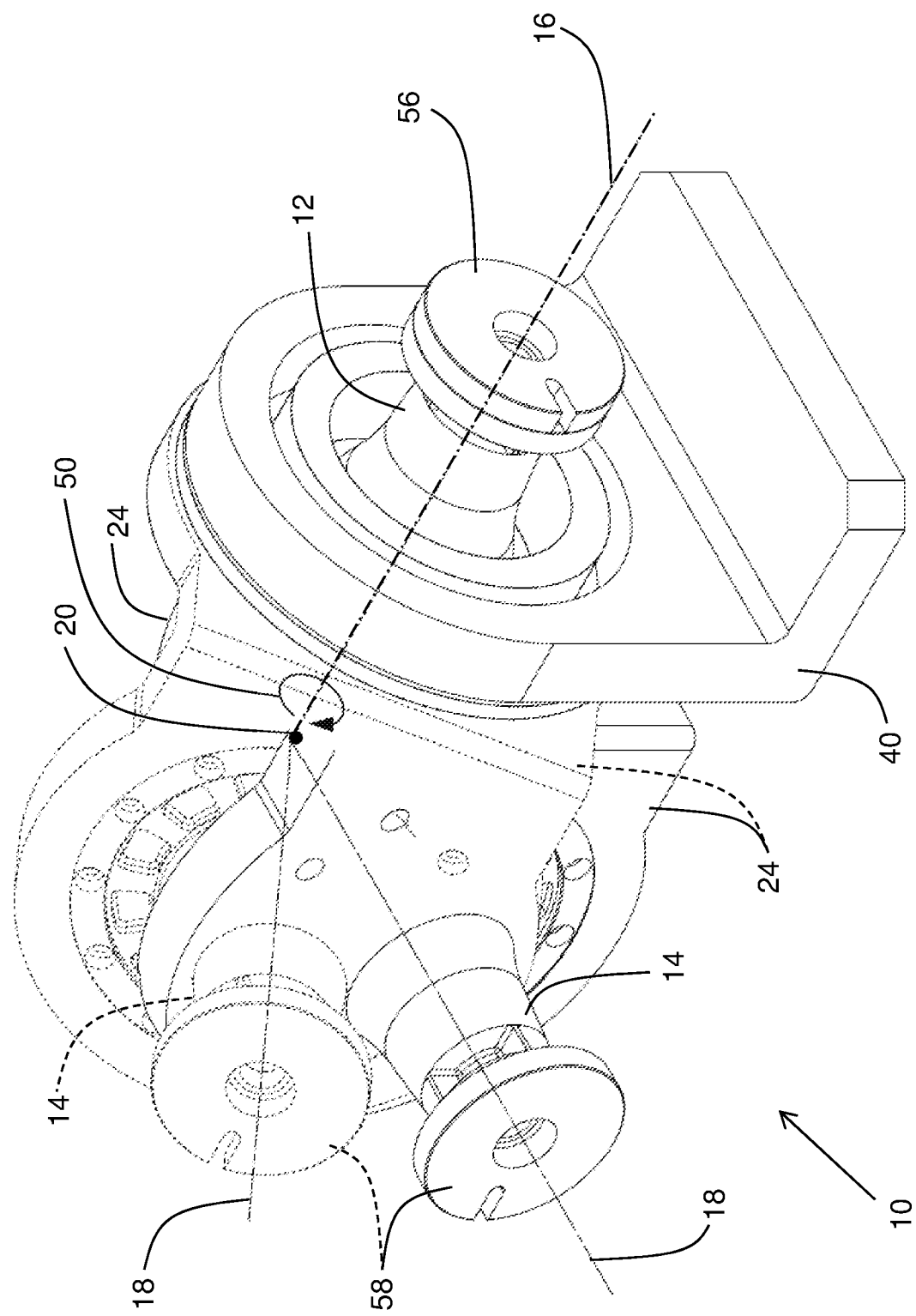
FIG. 4 is a simplified front perspective view of the embodiment of FIG. 1, showing the effect of rotation of the output feed horn axis about the input feed horn axis.
Figure 5:
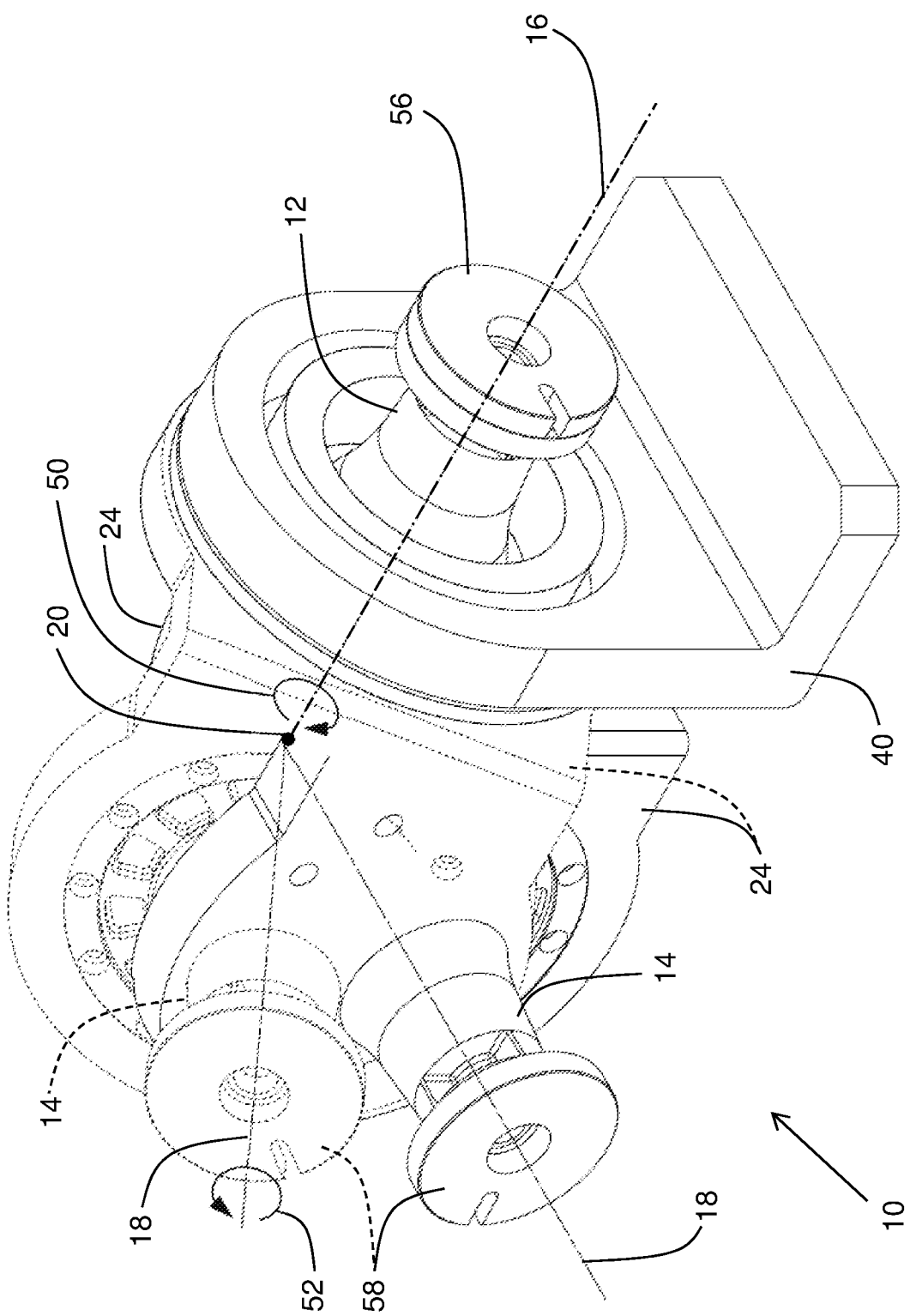
FIG. 5 is a view similar to FIG. 4, showing the effect of rotation of the output feed horn axis about the output feed horn axis.

As shown in FIGS. 4 and 5, examples of possible rotations within the matched horn coupler assembly 10 are illustrated. FIG. 4 shows, in stippled lines relative to solid lines, a first rotation (illustrated by arrow 50) of both (jointly) the second feed horn 14 and the mirror housing 24 relative to the first feed horn 12 and the supporting structure 40 about the first horn axis 16. In FIG. 5, there is shown, in addition to FIG. 4, in stippled lines, a second rotation (illustrated by arrow 52) of the second feed horn 14 relative to the mirror housing 24 about the second horn axis 18. These rotations are typically allowed by ball bearings or the like (not specifically shown) between the different components, depending on the configuration of the antenna feed system.

Figure 6:
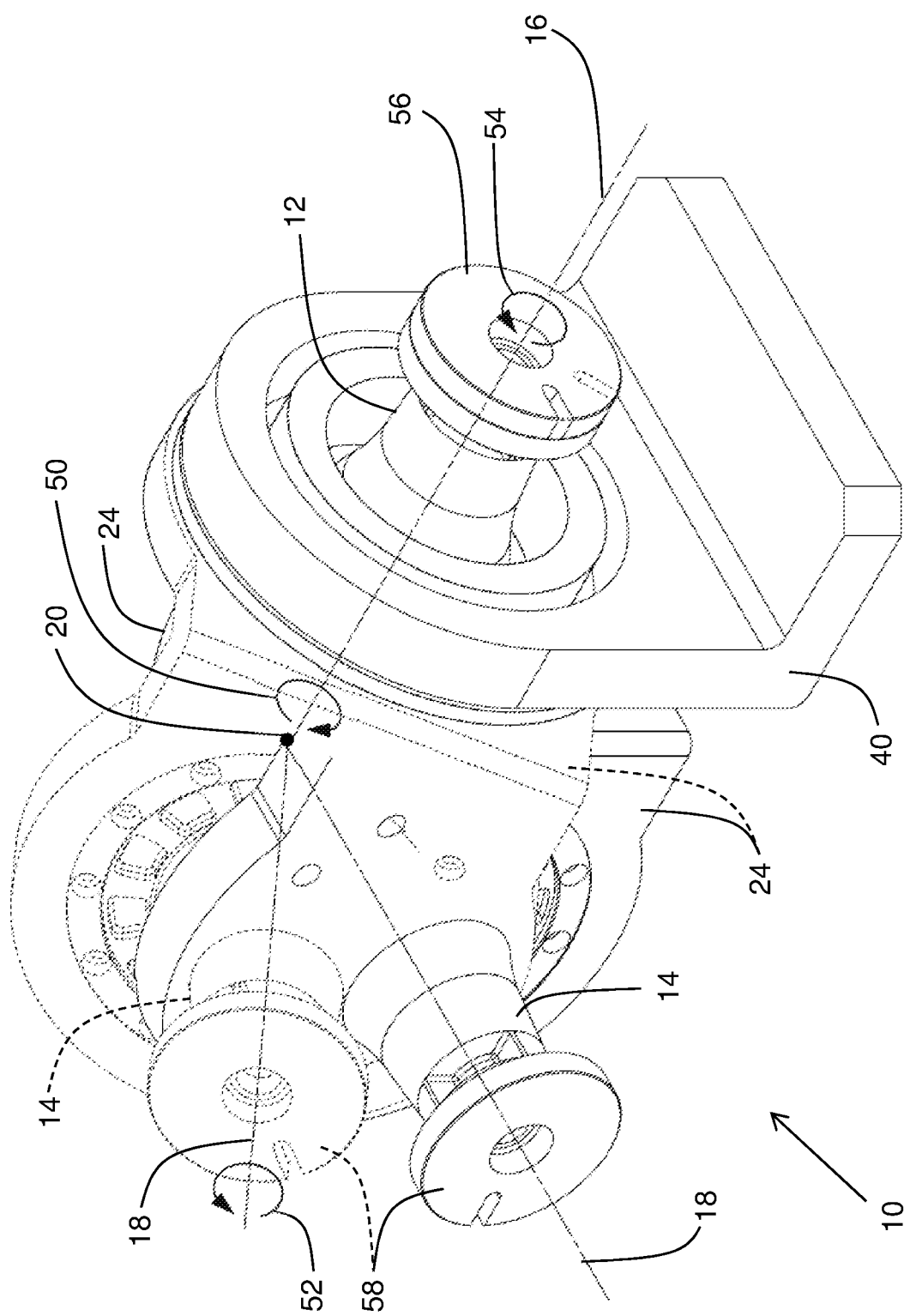
FIG. 6 is a view similar to FIG. 5, showing the effect of rotation of the output feed horn axis (and the mirror assembly) about the input feed horn axis and a simultaneous independent rotation of the input feed horn about the same axis.

Similarly, in FIG. 6, there is shown, in addition to FIG. 5, in stippled lines, a third rotation (illustrated by arrow 54) of the first feed horn 14 relative to about the first horn axis 16, and this third rotation is independent of the first rotation about the same axis 16.

The matched horn coupler assembly 10 of the present invention can be located anywhere within an antenna feed system, depending on the specific configuration thereof. At the first 36 and second 38 'free' interface of each one of the first 12 and second 14 feed horns, any arrangement or portion of an antenna feed system can be connected, as represented by the first 56 and second 58 notched flanges.

Figure 7:
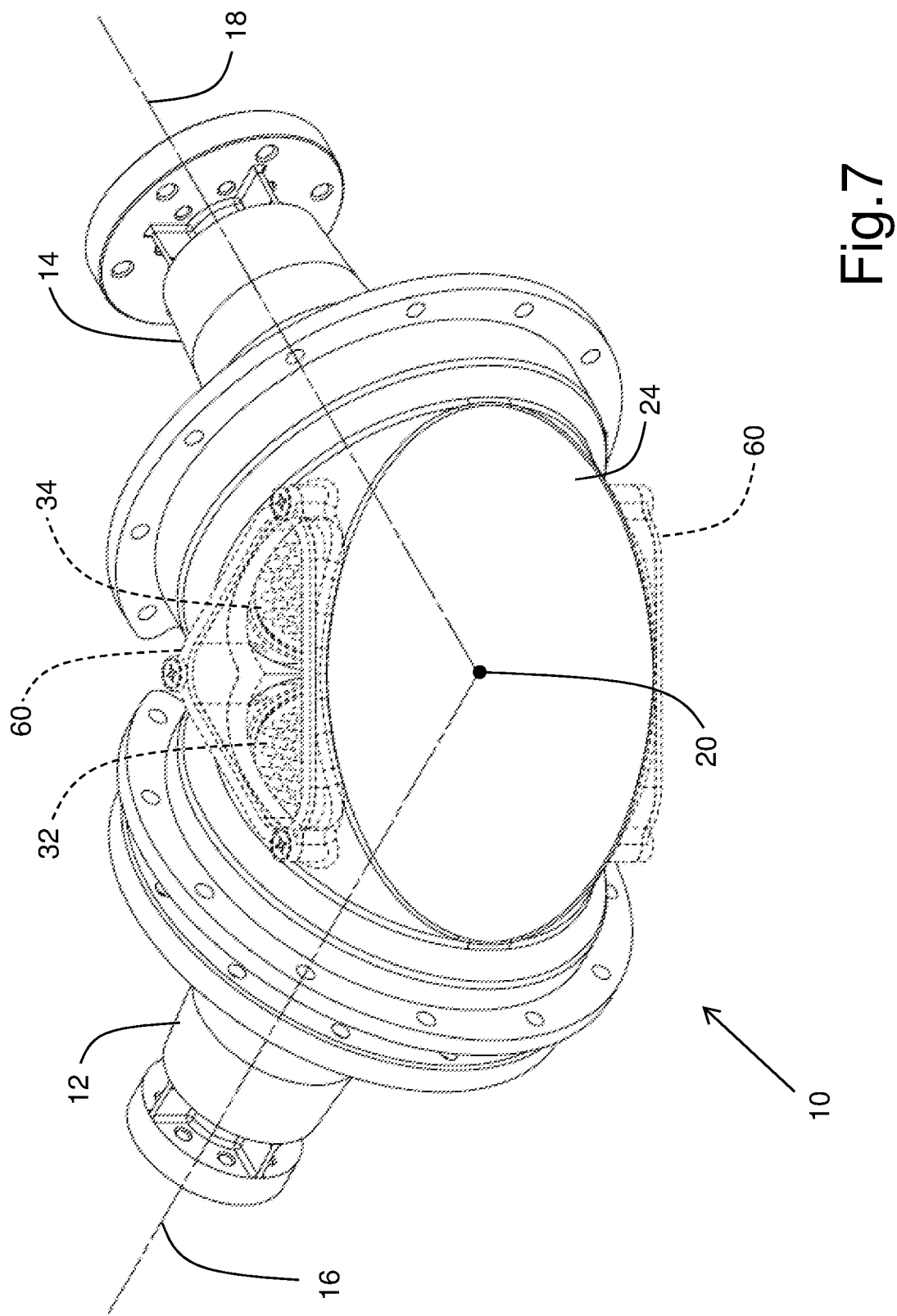
FIG. 7 is a rear perspective view of another embodiment in accordance with the present invention.

As shown in FIG. 7, the mirror housing 24 could include windows 60 or simply openings or the like without affecting the operation of the coupler assembly 10. In fact, these RF transparent (or semi-transparent) windows 60 allow dissipation of trapped modes of the signal(s) that could enter into resonance within the assembly 10 and affect the RF performance thereof, without having to use RF absorbing materials (not shown) that are more cumbersome.

Although the angle between the first 16 and second 18 feed horn axes are shown as being about 90 degrees, it would be obvious to one skilled in the art, without departing from the scope of the present invention, that any other angle could be considered. Similarly, the mirror 22 could be curved without departing from the scope of the present invention.

One skilled in the art of quasi-optical coupling devices will readily recognize that the projected electromagnetic fields of the first 12 and second 14 feed horns are to be conjugate matches of each other to maximize the coupling therebetween. The conjugate matched fields are manifested as a beam-waist of a fundamental Gaussian-beam mode at the reflection point 20 of the mirror 22.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

We claim:

1. A matched horn coupler assembly for use in a RF rotational joint for conveying an electromagnetic signal, the matched horn coupler assembly comprising:

first and second feed horns defining respective first and second horn longitudinal axes intersecting one another at an intersection point, the first and second feed horns connecting to a mirror for conveying the signal therebetween with the intersection point lying on a reflecting surface of the mirror, the reflecting surface defining a normal direction thereof at the intersection point, the normal direction being generally equally angularly spaced from both the first and second horn longitudinal axes; and first and second lenses connecting to respective said first and second feed horns and focusing the signal between the respective said first and second feed horns and at the intersection point;

wherein at least one of the first and second feed horns is rotatably connected relative to the mirror about the respective one of said first and second horn longitudinal axes.

2. The coupler assembly of claim 1, wherein the first feed horn is fixedly connected relative to the mirror and the second feed horn is rotatably connected relative to the mirror about the second horn longitudinal axis, the first and second feed horns and the mirror being rotatable relative to the first horn longitudinal axis.

3. The coupler assembly of claim 1, wherein the second feed horn is rotatably connected relative to the mirror about the second horn longitudinal axis, and wherein the second feed horn and the mirror are jointly rotatably connected to the first feed horn about the first horn longitudinal axis.

4. The coupler assembly of claim 3, wherein the second feed horn is rotatably connected relative to the mirror about the second horn longitudinal axis, and wherein the second feed horn and the mirror are jointly rotatably connected to a supporting structure about the first horn longitudinal axis.

5. The coupler assembly of claim 4, wherein the first feed horn is fixedly connected to the supporting structure.

6. The coupler assembly of claim 4, wherein the first feed horn is rotatably connected to the supporting structure about the first horn longitudinal axis.

7. The coupler assembly of claim 6, wherein the first feed horn and both the second feed horn and the mirror are independently rotatably connected to the supporting structure relative to one another.

8. The coupler assembly of claim 1, wherein the first and second feed horns and the mirror simultaneously convey a plurality of electromagnetic signals from the first feed horn to the second feed horn and/or from the second feed horn to the first feed horn.

* * * * *